UNITED STATES PATENT OFFICE.

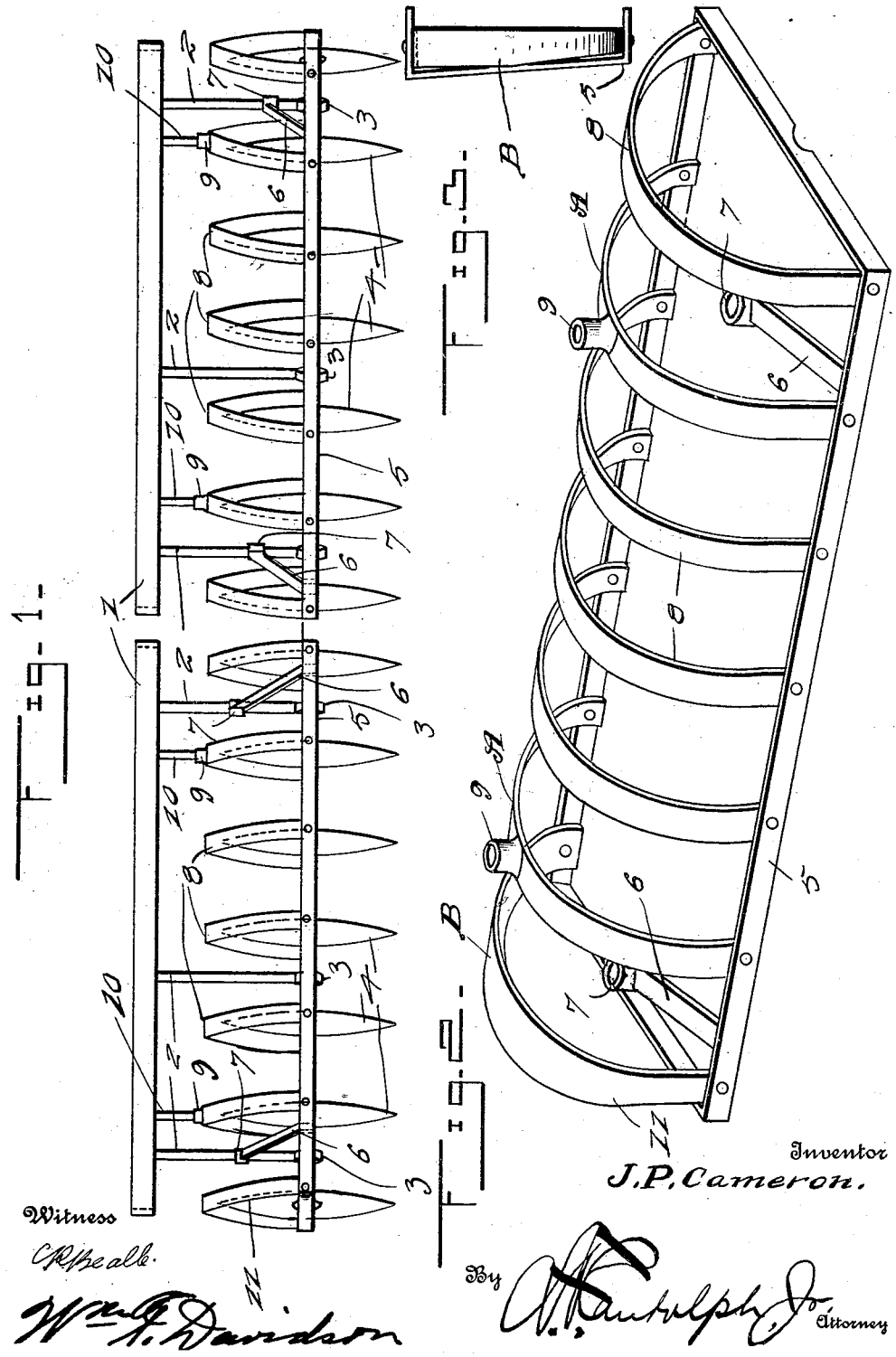

JOSEPH P. CAMERON, OF ATLANTIC, IOWA.

DISK-HARROW SHIELD.

1,230,464.  Specification of Letters Patent.  Patented June 19, 1917.

Application filed September 1, 1916. Serial No. 118,072.

*To all whom it may concern:*

Be it known that I, JOSEPH P. CAMERON, a citizen of the United States, residing at Atlantic, in the county of Cass and State of Iowa, have invented certain new and useful Improvements in Disk-Harrow Shields; and I do hereby declare the following to be a full, clear, and exact description of the invention, such as will enable others skilled in the art to which it appertains to make and use the same.

This invention relates to new and useful improvements in a disk harrow shield and one of its objects is the provision of a device of this character, which shall be simple, durable and efficient, and which may be manufactured and sold at a comparatively low cost.

Another object of this invention is to provide shields adapted to be placed over each of the disks of a disk harrow to prevent draft animals hitched thereto from stepping on or coming in contact with the disks, obviating injury to the animals.

A further object of this invention is to provide a frame having means for securing it to a harrow for supporting the shields in proper relation to the disks, so that the upper peripheries of the disks will be entirely covered to prevent objects from coming in contact therewith.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a front elevation of a disk harrow shield, constructed in accordance with my invention, Fig. 2 is a perspective view of the shield removed from the harrow, and Fig. 3 is a detail view illustrating the end shield of the series of shields.

Referring in detail to the drawing, the numeral 1 indicates the frame portions of a disk harrow and usually consists of two sections as clearly illustrated in Fig. 1. The sections being connected together in any well known manner. Downwardly depending standards 2 are secured to the frame 1 and have bearings 3 formed on their lower ends in which are journaled the shafts for supporting the disks 4. The foregoing description relates to a disk harrow of a well known construction, and to which my invention is applied.

Substantially rectangular frames 5 have secured adjacent each end thereof bracing strips 6 to which are secured collars 7 for connecting the bracing strips 6 to the downwardly depending standards 2, so as to support the frames upon the cultivator and having each of the disks located within the frames. Secured to the front and rear portions of the substantially rectangular frame 5 are a plurality of substantially U-shaped shields 8, which are adapted to overlie the upper periphery of the disks 4 to prevent draft animals from coming in contact with the disks, obviating the danger of their being injured. The shields which are designated by A and which are located adjacent the inner and outer shields have formed thereon socket members 9 to receive rods 10 which are in turn connected to the frame 1 of the cultivator. The inner shield of each frame designated by the letter B, has its forward portion cut away as illustrated at 11 to give a reduced width to the forward portion of the shields B so that the two pairs of series of disks are capable of being moved in substantially V-shaped formation which is a well known process in disk cultivators of this type, the shields B being cut away in this manner in the forward portion thereof will prevent the two inner shields from engaging or binding against each other.

From the foregoing description taken in connection with the accompanying drawing, it will be noted that a device has been provided which will efficiently protect the draft animals hitched to the cultivator from coming in contact with the peripheries of the disks, obviating the danger of the animals becoming injured.

While I have shown and described the preferred embodiment of my invention, it will be understood that minor changes in construction, combination and arrangement of parts may be made without departing from the spirit and scope of the invention as claimed.

Having thus described my invention, what I claim is:—

1. In combination, a disk harrow having a plurality of disks, a plurality of shields adapted to overlie the disks and extending parallel therewith, and means for securing the shields to the harrow.

2. In combination, a disk harrow having a plurality of disks thereon, a plurality of substantially U-shaped shields overlying the upper peripheries of the disks, a substantially rectangular frame surrounding the disks and secured to the shields, and means for securing the frame to the disk harrow.

3. In combination, a disk cultivator having a plurality of disks thereon, a plurality of substantially U-shaped shields overlying the upper peripheries of the disks, a rectangular frame surrounding the disks and secured to the ends of the shields, and bracing strips secured to the frame and to the cultivator.

4. In combination, a cultivator including a plurality of disks thereon, a plurality of shields overlying the upper peripheries of the disks, a rectangular frame surrounding the disks and secured to the shields, the inner shield having its forward portion cut away, the shield adjacent to the inner and outer shields having formed thereon a socket member, rods secured to the socket member and to the cultivator, and braces secured to the frame and to the disk harrow.

In testimony whereof I affix my signature in presence of two witnesses.

JOSEPH P. CAMERON.

Witnesses:
A. H. KUNZE,
N. M. JOBES.

Copies of this patent may be obtained for five cents each, by addressing the "Commissioner of Patents, Washington, D. C."